(No Model.) 3 Sheets—Sheet 1.
O. & W. SWENSON.
HAY LOADER.
No. 581,963. Patented May 4, 1897.
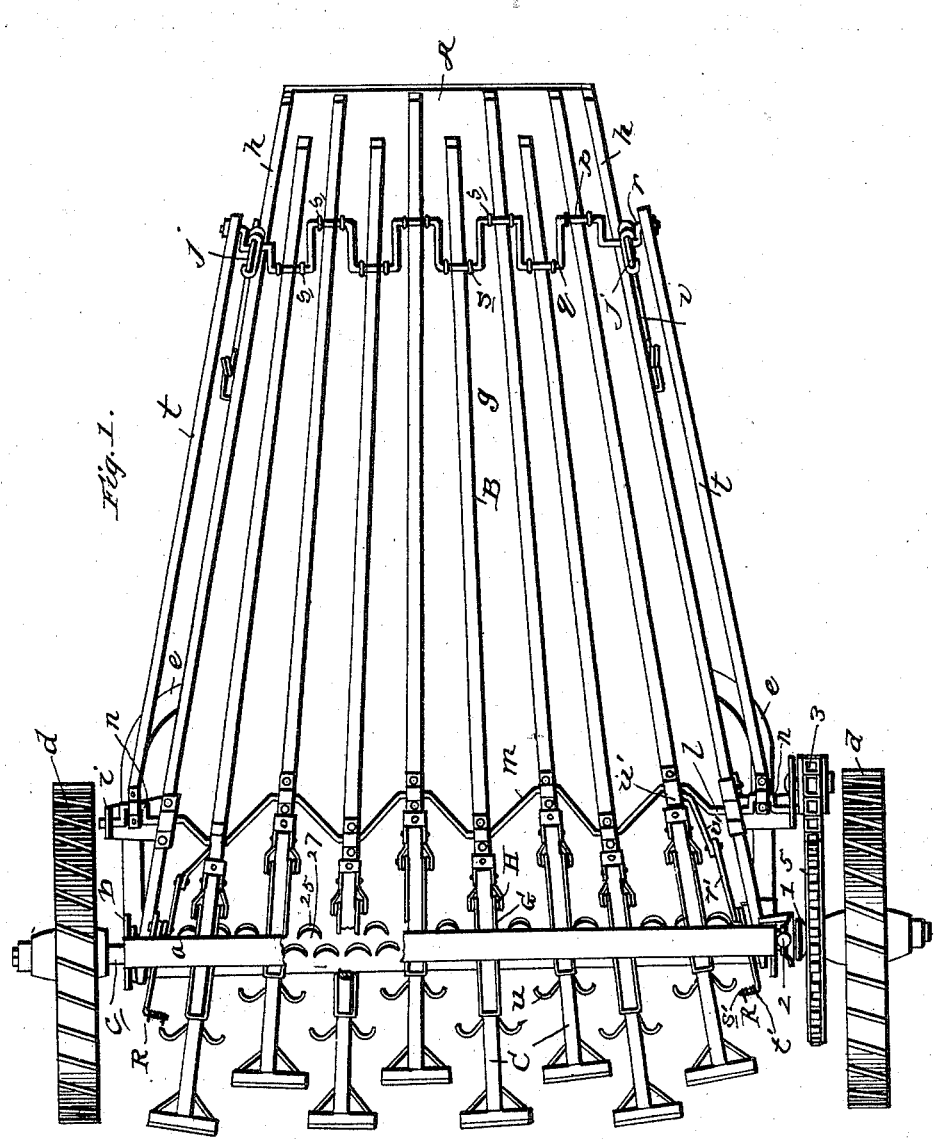

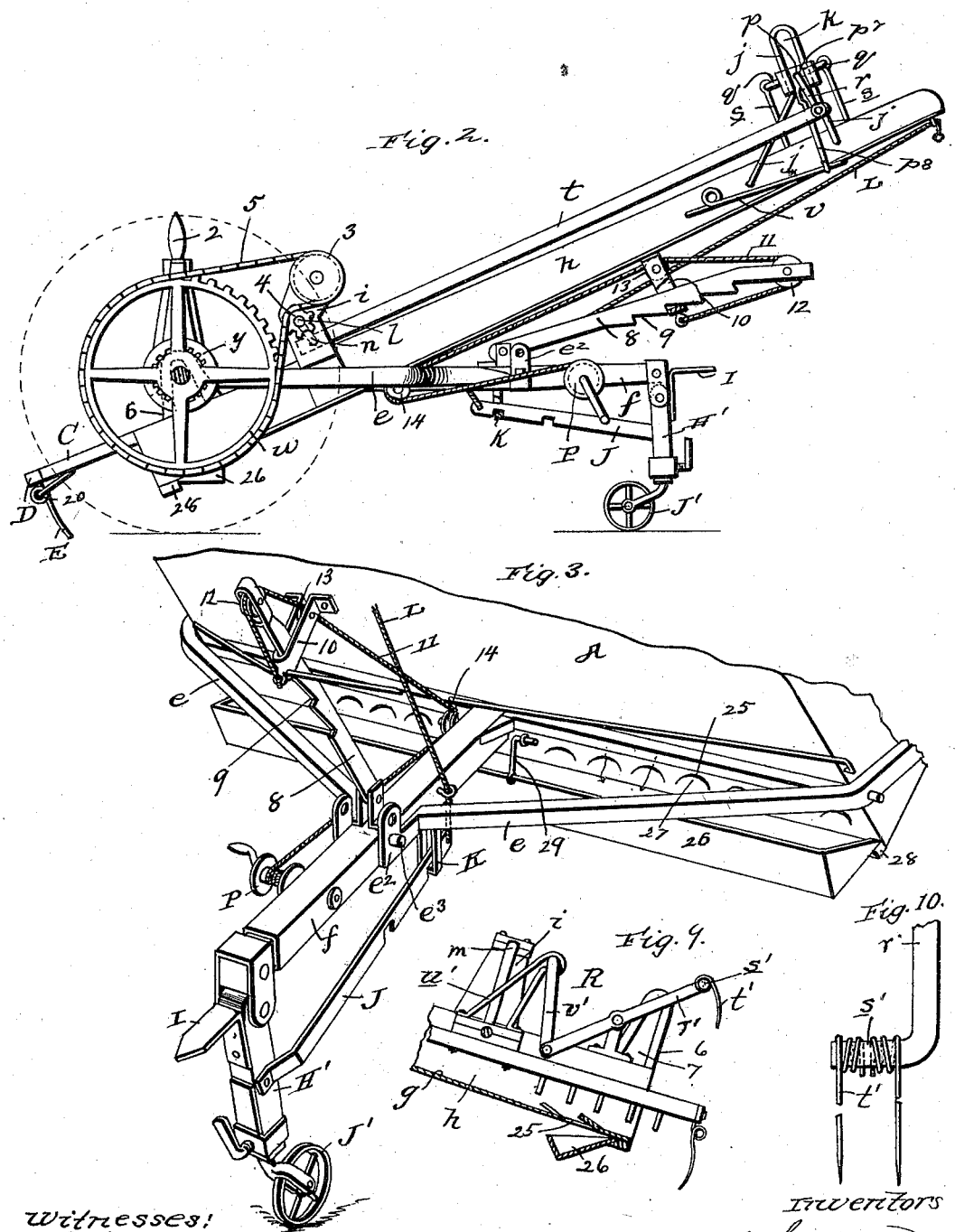

(No Model.) 3 Sheets—Sheet 3.
O. & W. SWENSON.
HAY LOADER.
No. 581,963. Patented May 4, 1897.
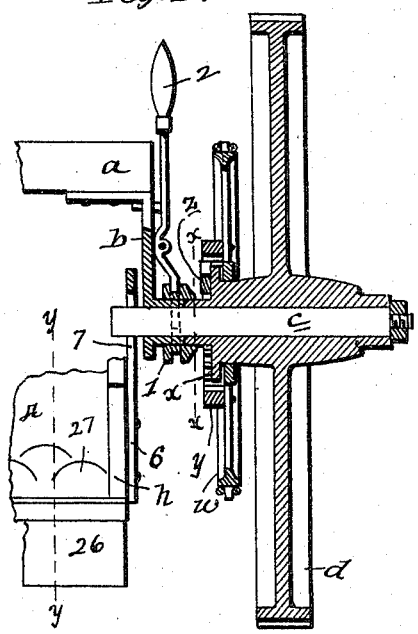
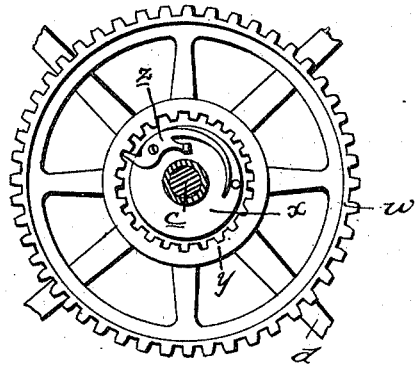
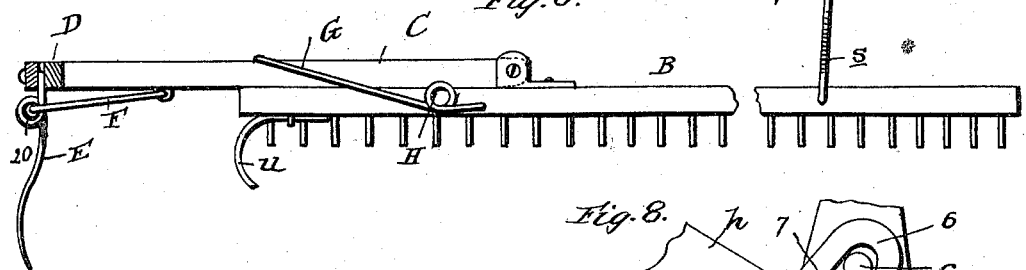
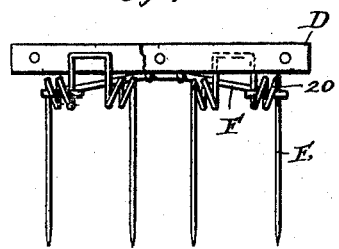
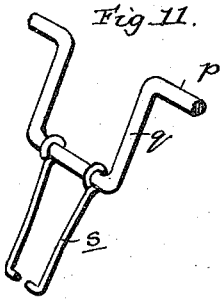
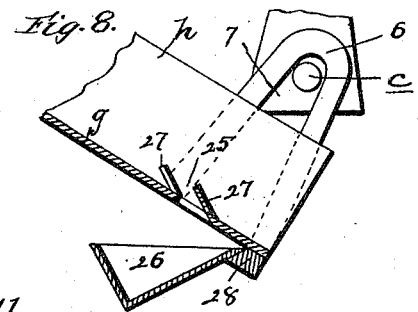
Witnesses:
C. H. Raeder
Walter James
Inventors
O. & W. Swenson
By James J. Sheehy
Attorney

UNITED STATES PATENT OFFICE.

OLE SWENSON AND WILLIAM SWENSON, OF CRESCO, IOWA.

HAY-LOADER.

SPECIFICATION forming part of Letters Patent No. 581,963, dated May 4, 1897.

Application filed January 3, 1896. Serial No. 574,213. (No model.)

*To all whom it may concern:*

Be it known that we, OLE SWENSON and WILLIAM SWENSON, citizens of the United States, residing at Cresco, in the county of Howard and State of Iowa, have invented certain new and useful Improvements in Hay-Loaders; and we do declare the following to be a full, clear, and exact description of the invention, such as will enable others skilled in the art to which it appertains to make and use the same.

Our invention relates to improvements in hay-loaders; and it is designed more particularly as an improvement upon the loader disclosed in our Letters Patent bearing date September 17, 1895, and numbered 546,602.

Among other things our present invention has for an object to provide a hay-loader embodying improved means whereby a person standing upon a wagon to which the loader is attached, or upon the load of hay upon said wagon, may quickly and easily disconnect the loader from the wagon.

Another object is to provide devices connected and operating in concert with the elevator-arms and designed and adapted to keep the corners of the elevator clear and thereby prevent stringing the hay in dividing it from the swath.

Other objects and advantages of the invention will be fully understood from the following description and claims when taken in connection with the accompanying drawings, in which—

Figure 1 is a plan view of our improved hay-loader. Fig. 2 is a side elevation with parts removed and the elevator shown as lowered. Fig. 3 is an enlarged detail perspective view illustrating the mechanism for supporting the elevator in its inclined position, together with the mechanism through the medium of which the loader may be disconnected from a wagon by a person on the wagon. Fig. 4 is a detail enlarged diametrical section taken through one of the traveling wheels and the parts connected therewith for transmitting motion to the elevator-arms. Fig. 5 is a detail section taken in the plane indicated by the line $x\ x$ of Fig. 4. Fig. 6 is a detail side elevation, partly in section, illustrating the peculiar advantageous manner of connecting the rake-arms and elevator-arms. Fig. 7 is a detail elevation showing how the teeth are connected to the rake-heads. Fig. 8 is a detail section on the line $y\ y$ of Fig. 4, showing the means for catching and holding the seed that is threshed out by the elevator-arms. Fig. 9 is a detail view of one of the corner-cleaners. Fig. 10 is a detail view illustrating the manner of connecting the teeth of the corner-cleaners to the levers. Fig. 11 is a detail perspective view of one of the bails for connecting the elevating-arms and the upper rock-shaft.

In the said drawings similar letters and numerals designate corresponding parts in all of the views.

As in the machine disclosed in our before-mentioned Letters Patent, the frame or carriage of the improved machine consists of a cross-bar $a$, from which hangers or standards $b$ are downwardly projected, and to each standard or hanger, at its lower end, a short axle $c$ is secured, upon the outer end of which a traveling wheel $d$ is journaled, and a yoke $e$ is secured to the said standards, being forwardly and horizontally projected, and said yoke is attached in any suitable manner to the tongue $f$, as better shown in Fig. 3. The tongue $f$ is adjustably connected with the yoke $e$ by the casting $e^2$, having a plurality of apertures, and the removable transverse pin $e^3$, as shown in Fig. 3, so as to permit of the tongue being adjusted to suit wagons of various heights.

The elevator A consists of a body comprising a floor $g$ and side pieces $h$, and the body of the said elevator is made tapering, being made preferably about half the width at its upper end that it is at its base.

From each side of the elevator-body near the base an angled bracket $i$ is projected, and at each side near the top a standard $j$ is secured, provided with a longitudinal slot $k$, as shown in Fig. 2. In the lower brackets $i$ a crank-shaft $l$ is journaled, which extends across the elevator-body. This shaft is mounted to revolve, and its crank-arms $m$ between the sides of the elevator-body are much larger than the crank-arms $n$ at the ends of the shaft, and in the slotted portions of the upper standards $j$ are arranged slides $p^7$, in which a rock-shaft $p$ is journaled, the crank-arms $q$ whereof correspond in number to the crank-arms of the rotary shaft $l$ at the base of the elevator. This shaft $p$ also has crank-arms $r$ at its ends, as shown. Each crank-arm $q$ has pivotally secured thereto a bail $s$, and the short crank-arm $r$, at each end of the upper or rock-shaft $p$, is connected by a pitman $t$ with the smaller crank-arms $n$ at the ends of the lower crank-shaft $l$.

An elevator-arm B, consisting of a bar, is pivotally attached to each crank-arm $m$ of the lower shaft $l$ and is likewise pivotally connected with a bail $s$ of a corresponding crank-arm on the upper rock crank-shaft $p$, as is best shown in Fig. 1, and the said elevator-arms B are of a length substantially that of the elevator, or practically so. Each elevator-arm B is provided upon its lower face with a series of teeth, and at the lower end of each elevator-arm hook-shaped teeth $u$ are attached to its under side, and these teeth, as shown in Fig. 6, extend rearwardly and laterally beyond the arms.

The rock crank-shaft $p$ is held in its proper position with relation to the floor $g$ and is permitted to adjust itself to the bulk of hay upon the elevator by the springs $v$, which are connected to the side boards $t$ of the elevator and extend through eyes in links $p^8$, connected to and depending from the slides $p^7$, as shown.

The elevating-arms B are rotated from the right-hand axle of the frame, and the construction is substantially as follows: A chain-wheel $w$ is loosely mounted upon the hub of the right-hand traveling wheel, as shown in Fig. 4, being prevented from slipping therefrom by means of a flange $x$, formed in any suitable manner on the inner end of the hub after the chain-wheel is placed thereon. Said chain-wheel $w$ has a ratchet-wheel $y$, provided with interval teeth. These teeth are normally engaged by a spring-pressed dog $z$, and this dog is pivoted upon the hub of the traveling wheel. Therefore normally the chain-wheel will turn with the ground-wheel, but it may be made to turn loosely on the hub of this ground-wheel through the medium of a shifting device which preferably consists of a conical bushing 1, mounted to slide on the sleeve projecting from bracket $b$ and the sleeve projecting from the inner end of the hub and which is operated by a shifting-lever 2. When the bushing 1 is out of engagement with the dog $z$ the chain-wheel $w$ and the traveling wheel $d$ will move together, but when the bushing 1 is forced outward it will ride upon the spring-controlled end of the dog $z$ and compress that end, therefore carrying the opposite end out of contact with the teeth of the wheel $y$. In consequence of this the chain-wheel will not be operated at this time by the ground-wheel, and the elevator-arms will not be operated. A grooved pulley 3 is journaled upon the upper end of the right-hand bracket $i$ of the elevator, and a small chain-wheel 4 is secured upon the extremity of the shaft $l$, while a driving-chain 5 is made to engage with the large and small chain-wheels in the manner better illustrated in Fig. 2.

The elevator A is provided at each side of its base portion with a hanger 6. Each hanger 6 is provided with a slot 7, through which the axle passes. The elevator is given desired inclination through the medium of a bar 8, pivoted upon the pole $f$ or yoke $e$, the bar having a series of notches 9 produced in its under edge, and the notched portion of the bar is made to pass through a keeper 10, secured to the under side of the elevator-body. A cord or chain 11 is connected to the keeper 10 or other part of the elevator-body and is passed around a pulley 12, carried at the free end of the bar 8, the said cord or chain being then passed over a pulley 13, carried by the keeper 10, and thence around a pulley 14 on the tongue or pole $f$. In our before-mentioned patented construction the lower end of the cord 11 is left free to be drawn by hand, but in the present construction it is connected to a windlass P, supported on the tongue $f$, the said windlass being provided to enable a person to raise and lower the elevator without undue exertion.

With the exception just mentioned the machine thus far described is substantially similar to the machine disclosed in our before-mentioned Letters Patent, the same being thus fully disclosed in order to impart a better understanding of our improvements, which will now be described.

C indicates the rake-arms of the improved machine. These rake-arms are arranged upon and are pivotally connected at one end to the elevator-arms B, so as to permit their free ends, which extend beyond the arms B, to move upwardly, and at the said free ends the arms C are provided with rake-heads D, which comprise two sections connected by screws, as better shown in Fig. 6. The said heads D are provided with teeth E, and these teeth, which are arranged in pairs and are resilient and are connected at intermediate points of their length to the heads, are provided at an intermediate point of their length with coils 20, which are designed to render the teeth sufficiently stiff to enable them to rake the hay and yet enable them to give when they meet an obstruction, so as to pass the same without being broken. The said teeth E are rendered less resilient and their connection with the heads D and arms C is strengthened by the arms F, which are connected to the under side of the arms C and are provided at their outer ends with lateral branches, which take through the coils of the outer teeth E, as better shown in Fig. 7. The rake-arms are normally held against the elevator-arms B by the loops G, of resilient metal, which straddle the arms C and have their ends fixedly connected to the arms B, and are provided on opposite sides of said arms with coils H. This manner of holding the arms C against the arms B enables the arms C to rake the hay up on the elevator-body and yet permits said arms to give upwardly when the teeth E meet an obstruction, so as to further reduce the liability of breaking the said teeth and the rake-arms.

In order to catch and hold the seed that is threshed out of the hay by the action of the elevator-arms B, we provide the openings 25 in the bottom $g$ of the elevator-body adjacent to the lower end thereof and the receptacle 26, which is arranged below the openings 25 and is designed to catch and hold the seed when it drops through said openings.

The openings 25 in the elevator-bottom $g$ may be formed in any suitable manner, but we prefer to form them by striking up the metal of the bottom, as better shown in Fig. 8, as by this manner guards 27 are formed below the openings, which guards while not offering any obstruction to the upward passage of the hay prevent the seed from passing over the openings 25 and compel the same to take through the openings into the receptacle. The said receptacle 26, which is preferably of the form in cross-section shown in Fig. 8, is designed to be removed from the elevator to be discharged of its collected seed, and it is therefore connected with the elevator as shown—that is to say, one of its edges is placed in engagement with an undercut ledge 28 on the elevator, while its other edge is connected by a hook 29 with the elevator-body, as shown.

H' indicates a leg which is loosely connected by a strap or other suitable means with the forward end of the tongue $f$ and is provided with a hook I, adapted to engage a staple at the rear end of a wagon to be loaded and thereby effect a connection of the loader to said wagon. This leg H' is provided at its lower end with a wheel J' to permit of the loader being more easily drawn up to a wagon, and it is designed to swing or be moved rearwardly and upwardly to enable the hook I to engage a loop or eye at the rear end of a wagon, as presently described. In order to permit a person on the wagon or on the load thereon to effect a disconnection of the loader from the wagon, we provide the bar or strap J, which is pivotally connected to the leg and is notched in its under edge to enable it to engage a keeper K on the yoke $e$ and thereby hold the leg in its vertical position and also in its raised or approximately horizontal position. Connected to the rear end of the bar J and extending up through suitable guides to the top of the elevator-body is a cable L, and by pulling on this cable it will be seen that the operator on top of the load is enabled to raise the bar J out of engagement with the keeper K. When this is done, the weight of the loader will cause the leg H' to swing downwardly and forwardly to the position shown in Fig. 2, so as to enable the loader to disengage itself from the wagon, and when the operator releases the cable L the bar J will automatically engage the keeper K and will hold the leg H' in its upright position beneath the tongue $f$ and enable it to support the weight of the elevator.

R indicates corner-cleaners, which are arranged at each side of the elevator-body at the lower end thereof. These cleaners R are connected with and are designed to be actuated by the shaft $m$, and when so actuated they are designed to clean the corners and are also designed to prevent stringing of the hay in dividing it from the swath. The said corner-cleaners R, of which two are employed, preferably comprise levers $r'$, which are fulcrumed at an intermediate point of their length upon suitable supports rising from the side pieces $h$ of the frame, heads $s'$, carried at the lower ends of the levers $r'$ and having teeth $t'$, which by reason of their peculiar construction are adapted to give if they meet an obstruction, brackets $u'$, connected with the adjacent elevator-arms B, and links $v'$, connecting the brackets $u'$ and the upper ends of the levers $r'$. In virtue of this construction it will be seen that when the elevator-arms B move downwardly the lower ends of the levers $r'$ will be raised, and when the elevator-arms move upwardly the lower ends of the levers $r'$ will be moved downwardly. Consequently the teeth at the lower ends of levers $r'$ are enabled to hold the hay while the adjacent arms B are raised.

It will be observed from the foregoing that our improvements constitute a highly-efficient hay-loader and one which may be quickly and easily connected to and disconnected from the wagon to be loaded, which may be conveniently adjusted with the exercise of but little effort on the part of the operator, and which may be conveniently moved from place to place.

Having described our invention, what we claim is—

1. In a hay-loader, rake-arms having heads, teeth of resilient material having coils and also having intermediate portions secured in the heads, the arms connected to the rake-arms and having lateral branches taking through the coils of the outer teeth, and loops of resilient material straddling the rake-arms and having their ends fixedly connected to the elevator-arms and also having coils, substantially as specified.

2. In a hay-loader, the combination of an elevator-body, elevator-arms connected with the body and having teeth on their under side at intervals in their length and also having the hook-shaped teeth $u$, at their lower ends, rake-arms pivotally connected at one end with the upper side of the elevator-arms at an intermediate point in the length thereof and having heads at their opposite end provided with teeth and spring devices for normally holding the rake-arms against the elevator-arms adapted to enable the rake-arms to move upwardly when they meet an obstruction, substantially as specified.

3. A hay-loader comprising an elevator-body having a metallic bottom struck up to form openings and inclined guards below the same, an undercut ledge connected to the under side of the body below the openings and a receptacle having one edge engaged and supported by the ledge and its opposite edge detachably connected with the body, and means for raising hay on the body, substantially as specified.

4. In a hay-loader, the combination of a supporting-frame, an elevator-body connected with the frame, a tongue also connected with the frame and having a keeper, a leg loosely connected with the tongue and having means for connection to a wagon and adapted to swing rearwardly beneath the tongue to enable the loader to be connected with a wagon, a notched bar loosely connected with said leg and adapted to engage the keeper and a cord connected to said bar, substantially as and for the purpose set forth.

5. In a hay-loader, the combination of an elevator-body, a crank-shaft arranged adjacent to the lower end of the body, elevator-arms connected with and adapted to be operated by said crank-shaft, corner-cleaning devices comprising levers fulcrumed at intermediate points of their length on supports rising from the sides of the body and carrying teeth at their lower ends, brackets connected to the elevator-arms, and links connected to the upper ends of the levers and the brackets, substantially as specified.

6. In a hay-loader, the combination of a supporting-frame, an elevator-body connected with the frame, a tongue also connected with the frame and having a keeper, a leg loosely connected with the tongue and having means for connection to a wagon and adapted to swing rearwardly beneath the tongue to enable the loader to be connected with a wagon, and a device connected with the leg and adapted to engage the keeper, substantially as and for the purpose specified.

In testimony whereof we affix our signatures in presence of two witnesses.

OLE SWENSON.
WILLIAM SWENSON.

Witnesses:
 JAMES BLODGERT,
 GEORGE HENRY.